350-315. SR
05-16-72 XR 3,663,813

United States Patent

Shaw

[15] 3,663,813

[45] May 16, 1972

[54] OPTICAL READER FOR LUMINESCENT CODES LUMINESCING IN DIFFERENT WAVELENGTHS

[72] Inventor: Robert Frank Shaw, Bloomfield Hills, Mich.

[73] Assignee: American Cyanamid Company, Stamford, Conn.

[22] Filed: Jan. 19, 1970

[21] Appl. No.: 3,992

[52] U.S. Cl. ....................250/71 R, 235/61.115, 250/71.5 R, 250/83.3 R, 250/226, 350/315, 356/83

[51] Int. Cl. ....................G01j 3/06

[58] Field of Search ....................250/71, 71.5, 83.3, 226; 350/315; 235/61.115; 356/100, 83

[56] References Cited

UNITED STATES PATENTS 3,412,245 11/1968 Halverson....................250/71
3,492,478 1/1970 Smith....................250/71
3,235,798 2/1966 Strutt....................356/83

*Primary Examiner*—Morton J. Frome
*Attorney*—Samuel Branch Walker

[57] ABSTRACT

Symbols formed by marking a substrate with coded inks, the coding represented by the absence or presence in one or more levels of one or more photoluminescent components, are irradiated with ultraviolet light and the photoluminescence from the various coding components is projected through a dispersing agent, such as a prism or a grating, onto the sensitive surface of a television camera tube, such as a vidicon or orthicon, the output of the camera tube producing electrical pulses in each scan corresponding to the position of the various photoluminescent colors. The output can be read out on an oscilloscope or other readout device synchronized with the television camera electron scan. The presence of coding components are represented by pulses in corresponding positions and the height of the pulses can represent the level of component concentration if it is present in more than one concentration.

4 Claims, 2 Drawing Figures

INVENTOR.
ROBERT FRANK SHAW
BY
ATTORNEY

OPTICAL READER FOR LUMINESCENT CODES LUMINESCING IN DIFFERENT WAVELENGTHS

BACKGROUND OF THE INVENTION

Coding of symbols by the use of coding inks in which the code is the absence or presence in at least one level of photoluminescent coding components which luminesce in wavelength bands which have at least one wavelength or wavelength band not present in the luminescence of any of the other components has been generally described in the application of Freeman and Halverson, now U.S. Pat. No. 3,473,027, Oct. 14, 1969. The Freeman and Halverson patent prefers that at least one or all of the photoluminescent coding components are narrow band luminescers, of which complexes of lanthanide ions of atomic number greater than 57 are typical and preferred. When the code is constituted by the absence or presence of components, the number of symbols which can be represented is $2^n-1$. If presence in two different levels or concentrations is used, the number of symbols is $3^n-1$, in each case n designating the number of components.

The photoluminescent coded symbols represent desirable codes having many advantages. For example, the shape of the symbol marking area is immaterial. It may be small rectangles, circles, or any other suitable shape. It is not necessary that the symbol have a particular shape, such as a number or letter, although the coding component is also useful with such shaped symbols, for example when a pigment is included in the ink so that the symbols can be read either visually or by photoluminescence. If there is no pigment present, the coded symbols are secret and cannot be detected by visible observation as the photoluminescent materials are not colored. The readout of the coded symbols is by illumination with ultraviolet light and separate detection of the different colors, for example by separate detectors responding only to the unique wavelength band of each component or other means in which separate electrical signals for each luminescent wavelength band are produced. Electronic processing circuits can then interpret the signals in terms of the symbols coded.

As the marking areas for the coded symbols described by Freeman and Halverson are quite small, spacing of detectors may represent a problem. It has been solved in various ways, for example by fiber optics, beam splitting mirrors, and the like. However, there is still room for improved readout mechanisms, particularly those capable of extremely rapid response.

SUMMARY OF THE INVENTION

The present invention is directed to a readout mechanism in which the photoluminescent light from all of the components present in any particular symbol is projected through a dispersing element, such as a prism, grating, or the like, and the dispersed colors are then caused to strike the sensitive surface of a television camera, such as a vidicon or orthicon. The operation of the camera which scans by means of an electron beam produces electrical signal outputs in the form of a pulse wherever there is a portion of the surface which has been struck by photoluminescent light from a particular component. The television camera, which is typical of a time scanned photoelectric device, produces the pulses in the form of a train of pulses separated from each other which can be electrically read out, for example on an oscilloscope with the sweep synchronized with the scan of the camera in one direction, the position of the individual pulses corresponding to the particular components present in any one symbol. The electric signals can effect vertical deflection on an oscilloscope so that pulses of different energy can be represented on the oscilloscope as narrow rectangular figures of different heights. This is of importance if there is used a code in which a particular component may be present in more than one concentration.

For visual observation a number of repetitive scans may be used or long lasting oscilloscope phosphors employed and the like. In general, the exact representation of the scanned pulses can be of any suitable type, and the invention is, therefore, not limited to a single form, which is an advantage from the standpoint of flexibility and versatility of the invention. As a television camera operates very rapidly, for example horizontal scans in less than a fifteen-thousandth of a second, rapid response is available even if there are several repeating scans for each symbol read. The electronic processing circuits for the pulse train are well known, simple and reliable. The dispersing element has already separated the different wavelength responses and so simple equipment can be used for display, such as, for example, an oscilloscope, as described above.

As in other readout mechanisms, the symbols are moved past the readout head or mechanism, and in the present case this also occurs. It should be noted that where the symbol contains all of the components corresponding to the symbol together, there will be the same number of different wavelength bands in any part of the symbol.

The ultraviolet light illumination may be continuous or pulsed. However, as the different pulses from the camera tube are separated in any event, it is not necessary to use pulsed radiation and ordinary, substantially continuous ultraviolet illumination may be employed.

Where the number of symbols to be represented is fairly small, the advantages of codes which depend only on the presence or absence of coding components can, of course, be used in the present invention with the increase in optical signal-to-noise ratio.

Another advantage of the present invention is that filters are not needed as is the case with most of the detectors which have been used in most readout mechanisms in the past for photoluminescent coded symbols. When filters are used at least as many are needed as there are code components. In the present invention, however a single dispersing element can take the place of all of the filters.

Another advantage of the present invention is that all of the elements used can be of standard design. This is true of the optical dispersing elements and the television camera tube itself. As a result, since the design of the particular elements is not changed by their use in the combination of the present invention, the specific description which follows is largely semi-diagrammatic in nature.

DESCRIPTION OF THE PREFERRED EMBODIMENTS

A symbol marking area is shown at 1 in the form of a circle, enormously exaggerated in size for clarity. Excitation is from a standard UV lamp, which is shown purely diagrammatically as a rectangle 2. The ultraviolet beam strikes only a single marking area at a time. The symbol marking area on illumination with ultraviolet photoluminesces in all of the wavelength bands of the particular components present in the marking area and which define the symbol. It should be noted that some symbols require the presence of only one component, and it should, therefore, not be considered that the present case requires the presence of more than one photoluminescent component. The photoluminescent radiation, which is usually in the visible, although with some components may be in the very near infrared, is now projected through a dispersing element 3. The projection is shown purely diagrammatically as a lens, but of course any other suitable projection optics may be used. The dispersing element, which may be a prism, grating, and the like, now disperses the various wavelengths of the light striking it. This is shown generally as a series of wavelengths, $\lambda_1$ to $\lambda_n$. Wherever there is radiation in the particular band, when these strike the sensitive surface 5 of a television camera, such as an image orthicon, they will strike it in different places. Then when the camera scans in the normal manner with an electron beam, an electrical output results with a pulse at every position where there has been a dispersed wavelength striking the sensitive surface of the camera tube. As the tube is not changed by the present invention, it is shown purely diagrammatically as a cylinder 6. Normally it is not necessary to have the surface scanned in two directions to the same degree as in an ordinary television screen. For example, simply horizontal scanning can be used. Of course if the beams are projected in the form of short lines, there can be a small amount of scanning in this direction also to increase the electrical output of the camera.

Figure 1:
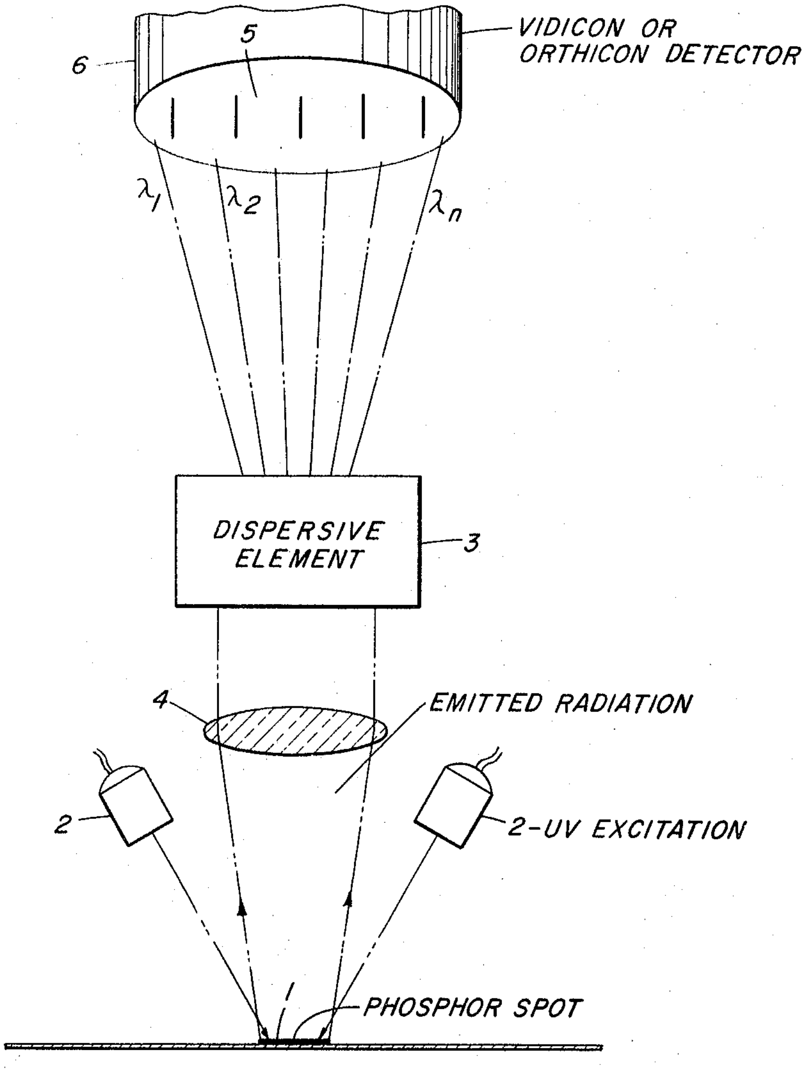
FIG. 1 is a diagrammatic showing of the light path in readout.
Figure 2:
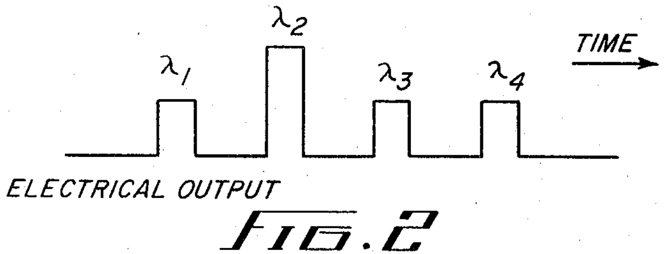
FIG. 2 is a graphical representation of a pulse train which can be obtained from the output of the camera tube.

As a typical example of coding, a four component code can be used with lanthanide ion complexes of europium, terbium, samarium, and dysprosium. FIG. 2 illustrates pulse output in visible form and also illustrates the modification in which the intensity of a particular radiation due to different levels or concentrations is represented by a pulse of greater or lesser amplitude. It will be seen that in FIG. 2 the particular symbol had all four coding components present, and one of them, $\lambda_2$, for example the europium complex, in twice the concentration of the others. The pulse height is shown with a corresponding difference. In the illustrated representation four components would permit the representation of 80 different symbols, ($3^4$—1).

FIG. 2 represents a very simple diagrammatic showing of the pulse train representing visual pulses. Other readout mechanisms can utilize the same data and operate printout devices, for example typewriter printouts and the like. However, as the present invention may be considered to stop after a pulse train has been produced in the output of the camera, the more simple visual output form is used as a typical representation. It will be noted that the components are all narrow band photoluminescent materials and therefore the pulses are quite narrow and of substantially the same width. It is also possible to have one and, in rare cases, two components which photoluminesce with broader bands, for example an organic material, such as a diphenyl anthracene or diphenyl imidazolone, which photoluminesce in the blue but over a much wider band, for example, than the luminescing complex of thulium, which luminesces in a very narrow band at 0.48$\mu$. In such a case, of course, the pulse corresponding to this component would be wider and would not have quite as sharp leading and trailing edges. Because the various wavelengths from the dispersing element are projected in a divergent beam, as illustrated, the separation of pulses can be sufficiently great so that the lack of extreme narrow band width is not so serious. This is an inherent and practical advantage of the present invention.

I claim:

1. A method for processing information comprising a. providing said information as a coded symbol marking area in which the code is the presence or absence of at least one level of photoluminescing components, each component luminescing under excitation from ultraviolet light in at least one wavelength band not shared by any other component, b. illuminating said symbol marking area with ultraviolet light, causing photoluminescence in the bands corresponding to the particular coding components present, c. projecting said photoluminescence into a light beam, d. dispersing said beam into different wavelength bands and projecting these bands on a photosensitive surface, e. scanning said photosensitive surface with an electron beam to produce a pulse train with pulses corresponding to each dispersed wavelength band, and f. detecting said pulses to read said coded symbol.

2. A readout mechanism according to claim 1 in which the electron beam scanned photosensitive surface is part of a television camera tube.

3. A method according to claim 1 in which pulses of different characteristics are produced by different intensities of dispersed beams, whereby readout of coded symbols in which the code constitutes the absence or the presence in more than one level of photoluminescent components is effected.

4. A readout mechanism according to claim 1 including means to display said pulse train.

* * * * *